United States Patent
Shohda et al.

(10) Patent No.: US 10,637,204 B2
(45) Date of Patent: Apr. 28, 2020

(54) PLANAR WAVEGUIDE LASER DEVICE

(71) Applicant: Mitsubishi Electric Corporation, Tokyo (JP)

(72) Inventors: Fumio Shohda, Tokyo (JP); Yojiro Watanabe, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/307,209

(22) PCT Filed: Jul. 28, 2016

(86) PCT No.: PCT/JP2016/072163
§ 371 (c)(1),
(2) Date: Dec. 5, 2018

(87) PCT Pub. No.: WO2018/020641
PCT Pub. Date: Feb. 1, 2018

(65) Prior Publication Data
US 2019/0148903 A1    May 16, 2019

(51) Int. Cl.
*H01S 3/06* (2006.01)
*H01S 3/063* (2006.01)
*H01S 3/16* (2006.01)

(52) U.S. Cl.
CPC ............ *H01S 3/0621* (2013.01); *H01S 3/063* (2013.01); *H01S 3/0612* (2013.01); *H01S 3/0615* (2013.01); *H01S 3/0625* (2013.01); *H01S 3/0632* (2013.01); *H01S 3/1608* (2013.01); *H01S 3/1611* (2013.01); *H01S 3/1618* (2013.01)

(58) Field of Classification Search
CPC .... H01S 3/0632; H01S 3/0612; H01S 3/0625; H01S 3/0615; H01S 3/1618; H01S 3/1611; H01S 3/1608; H01S 3/0621; H01S 3/063
See application file for complete search history.

(56) References Cited

U.S. PATENT DOCUMENTS

| | | | |
|---|---|---|---|
| 7,193,771 B1 * | 3/2007 | Smith | H01S 3/042 359/333 |
| 8,053,262 B2 * | 11/2011 | Tanisaka | B82Y 20/00 257/623 |
| 2010/0189151 A1 * | 7/2010 | Yanagisawa | H01S 3/0632 372/45.013 |
| 2013/0121355 A1 * | 5/2013 | Miyamoto | H01S 3/0632 372/36 |

FOREIGN PATENT DOCUMENTS

| | | |
|---|---|---|
| JP | 2006-184773 A | 7/2006 |
| JP | 2007-171775 A | 7/2007 |
| WO | WO 2009/016703 A1 | 2/2009 |

* cited by examiner

*Primary Examiner* — Xinning (Tom) Niu
(74) *Attorney, Agent, or Firm* — Birch, Stewart, Kolasch & Birch, LLP

(57) ABSTRACT

In a planar waveguide laser device (1), a substrate (6) is joined to the upper surface of a waveguide (2). A recess (6a) having a chamfered shape is formed along an edge of an end facet of the substrate (6) on the side of the waveguide (2), the end facet being perpendicular to the direction of laser oscillation. An end facet of the waveguide (2) perpendicular to the oscillation direction of laser light is covered with a coating (7). A wraparound portion (7a) continuing from the coating (7) covers the upper surface of the waveguide (2) facing the recess (6a) of the substrate (6).

12 Claims, 9 Drawing Sheets

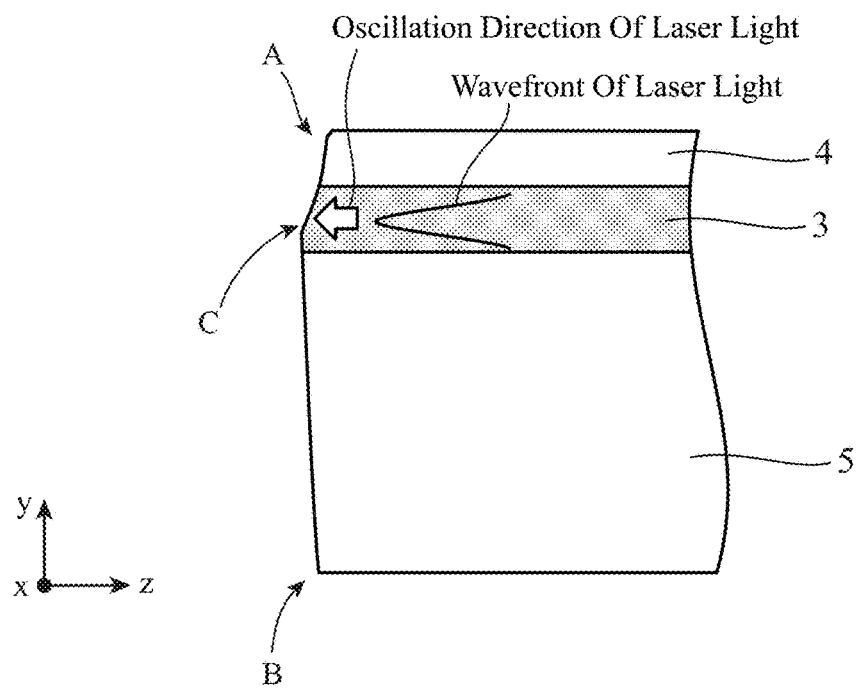

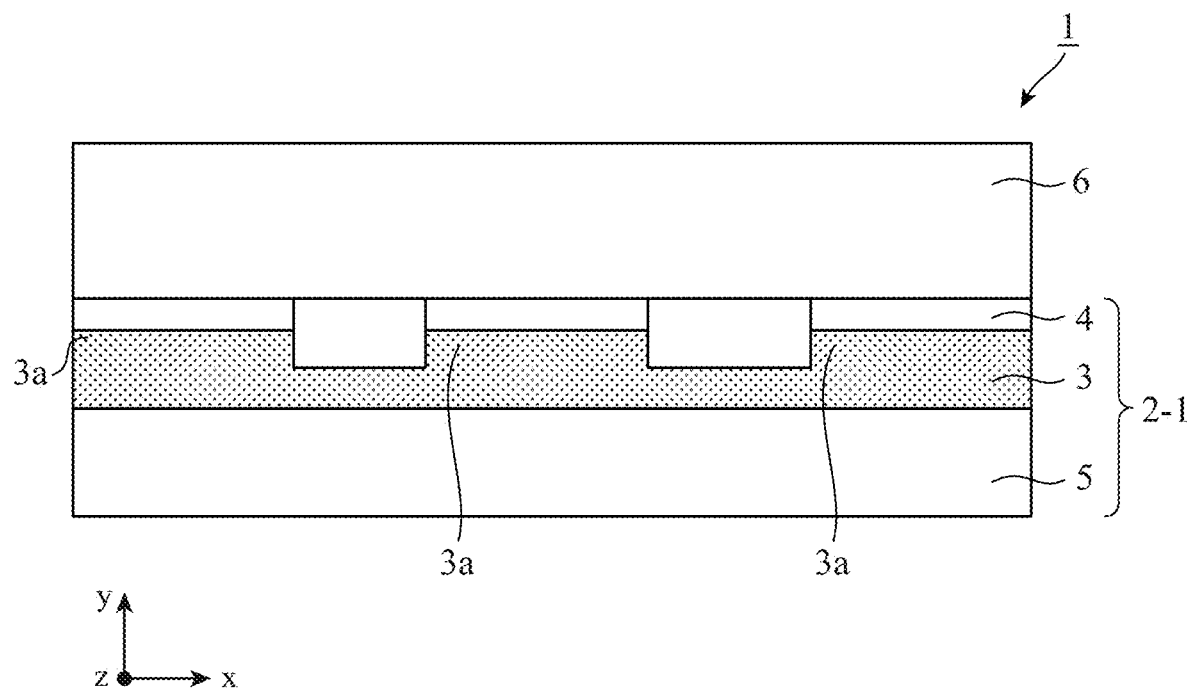

PLANAR WAVEGUIDE LASER DEVICE

TECHNICAL FIELD

The present disclosure relates to planar waveguide laser devices having a flat plate-like waveguide structure.

BACKGROUND ART

Planar waveguide lasers have a structure in which the upper and lower surfaces of a thin planar laser medium extending in the oscillation direction of laser light are sandwiched between cladding layers having a lower refractive index than that of the laser medium, and in which the laser medium serves as a waveguide. Such a planar waveguide laser has a thin waveguide and a high excitation density. Accordingly, even in a case where a laser medium with a small stimulated-emission cross-section is used, a large gain can be achieved, and a highly-efficient oscillation operation can be performed. Furthermore, by widening the waveguide in the width direction, the output can be scaled while the excitation density is maintained at a predetermined value.

A conventional planar waveguide laser device as disclosed in Patent Literature 1 has a waveguide that is formed with a laser medium and claddings joined to both faces of the laser medium. End facet(s) of this waveguide is coated with a dielectric multilayer film so as to have desired optical characteristics. Note that, for ease of explanation, the cladding joined to the upper surface of the laser medium will be hereinafter referred to as the upper cladding, and the cladding joined to the lower surface of the laser medium will be hereinafter referred to as the lower cladding.

In manufacturing planar waveguide laser devices, the upper and lower claddings having a lower refractive index than that of the laser medium are joined using a method such as vapor deposition or optical joining, or an optical adhesive, so that the upper cladding, the laser medium, and the lower cladding are integrated to form a waveguide. A portion to serve as an end facet of the integrated waveguide is optically polished, and then a coating is applied to the optically polished surface. Cutting is performed from a direction perpendicular to the waveguide surface, so that planar waveguide laser elements of a desired size are produced.

CITATION LIST

Patent Literatures

Patent Literature 1: WO 2009/16703 A

SUMMARY OF INVENTION

Technical Problem

In a case where optical polishing is performed on an end facet of the waveguide, or on a surface perpendicular to the direction of laser oscillation, in the process of manufacturing a planar waveguide laser device, sometimes the surface (end facet) is not made flat. The ideal shape of a waveguide end facet is a completely vertical shape, but sometimes the angle of the end facet is larger than that in the ideal shape. In a case where the increase in the end facet angle occurs in the laser medium, it may affect the characteristics of the laser. Specifically, the wavefront of the laser light propagating in the waveguide deteriorates at the end facet, and optical loss increases. As a result, desired laser characteristics cannot be achieved.

Furthermore, in the step of cutting a bar-shaped planar waveguide laser into laser elements of a desired size, a dicer is used, for example, and a blade is made to enter from a direction perpendicular to the waveguide surface so that the waveguide is cut. In a case where cutting is performed on a waveguide having its end facet already coated, the coating surface might come off the waveguide end facet, resulting in a decrease in device production yield. Thus, the conventional method for manufacturing planar waveguide laser devices involves a problem in that the end facet angle increases at the time of optical polishing or the coating surface comes off the waveguide end facet during the cutting step and therefore elements satisfying desired laser characteristics cannot be produced.

Furthermore, in a case where a hygroscopic material is used as the laser medium, a change might be caused in the characteristics of the laser element due to moisture absorption. Therefore, a planar waveguide laser device needs to be used in a humidity-controlled environment, and storage in a normal environment is difficult. Because of these aspects, there has been a problem in that the handling is difficult.

Embodiments in this disclosure have been made to solve the problems described above, and thus an object of the embodiments is to provide a planar waveguide laser device capable of reducing unevenness of a waveguide end facet, preventing a coating surface from coming off the waveguide end facet, and improving storability of a hygroscopic laser medium.

Solution to Problem

A planar waveguide laser device according to the present disclosure includes: a waveguide including a laser medium having a flat plate-like shape, an upper cladding joined to an upper surface of the laser medium, and a lower cladding joined to a lower surface of the laser medium; a substrate joined to an upper surface of the waveguide; the substrate comprising a recess with a chamfered shape along an edge of an end facet of the substrate, the edge facing the waveguide, and the end facet of the substrate being perpendicular to an oscillation direction of laser light; and a coating continuously covering an end facet of the waveguide perpendicular to the oscillation direction of laser light, and an upper surface of the waveguide facing the recess of the substrate.

Advantageous Effects of Invention

According to embodiments of the present disclosure, a substrate is joined to a waveguide, and a coating is formed to continuously cover an end facet of the waveguide perpendicular to the oscillation direction of laser light, and an upper surface of the waveguide facing a recess of the substrate. Thus, surface deflection can be prevented from occurring on a waveguide end facet during optical polishing, and therefore deterioration of the wavefront of light on the coating surface can be prevented to reduce optical loss. Moreover, because the stickiness between the end facet of the waveguide and the coating surface is increased, the coating surface does not easily come off the end facet of the waveguide. Furthermore, in a case where a hygroscopic material is used as the laser medium, because moisture can be prevented from flowing in, storage in a normal environment is made easier.

BRIEF DESCRIPTION OF DRAWINGS

FIG. 3A is a diagram showing the shape of a waveguide with a surface deflection.

FIG. 3B is a diagram showing an ideal shape of a waveguide with no surface deflections.

FIG. 9 is a diagram showing a modification of the planar waveguide laser device according to Embodiment 3.

DESCRIPTION OF EMBODIMENTS

To explain the present disclosure in greater detail, embodiments of the present disclosure are described below with reference to the accompanying drawings.

Embodiment 1

Figure 1A:
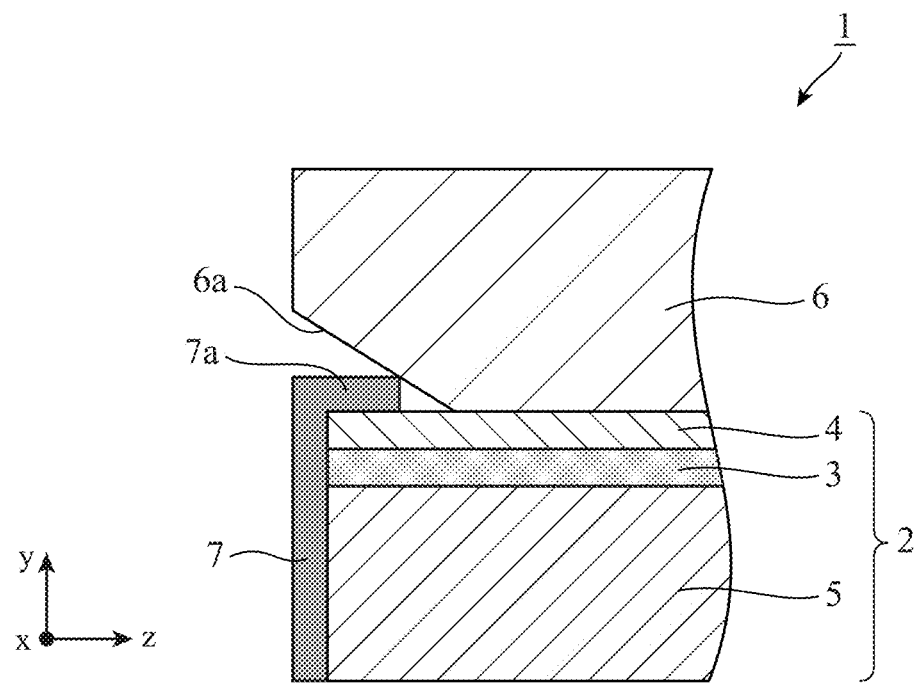
FIG. 1A is a cross-sectional view showing the relationship between a waveguide and a coating in a planar waveguide laser device according to Embodiment 1 of the present disclosure.
Figure 1B:
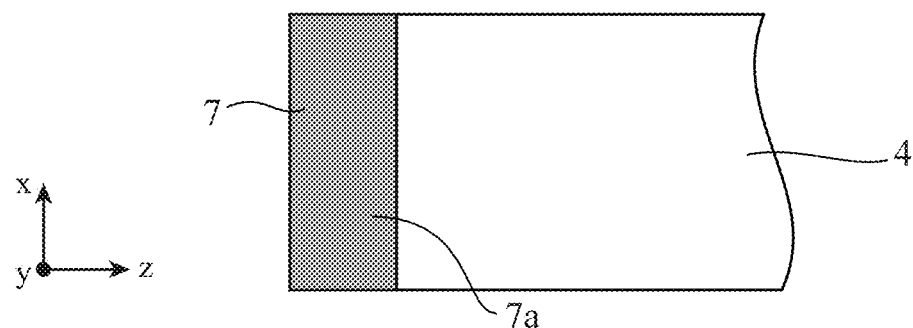
FIG. 1B is a top view showing the relationship.

FIG. 1A is a cross-sectional view showing the relationship between a waveguide 2 and a coating 7 in a planar waveguide laser device 1 according to Embodiment 1 of the present disclosure. FIG. 1B is a top view showing the relationship between the waveguide 2 and the coating 7 in the planar waveguide laser device 1 according to Embodiment 1 of the present disclosure. In FIG. 1B, a substrate 6 is not shown.

Note that, in the drawings, the x-direction, the y-direction, and the z-direction indicate the following respective directions.

The x-direction is the width direction of the planar waveguide laser element in a cross section perpendicular to the optical axis.

The y-direction is the thickness direction of the planar waveguide laser element in the cross section perpendicular to the optical axis.

The z-direction is the direction of the optical axis. The optical axis indicates the oscillation direction of laser light.

This convention about the x-direction, the y-direction, and the z-direction applies to the other figures as well.

As shown in FIGS. 1A and 1B, the planar waveguide laser device 1 includes the waveguide 2 having a laser medium 3, an upper cladding 4 and a lower cladding 5, the substrate 6, and the coating 7.

The waveguide 2 includes the planar laser medium 3, the upper cladding 4 joined to the upper surface of the laser medium 3, and the lower cladding 5 joined to the lower surface of the laser medium 3. The laser medium 3, the upper cladding 4, and the lower cladding 5 are stacked in a direction perpendicular to the optical axis corresponding the oscillation direction of laser light. For ease of explanation, one surface of the laser medium 3 is referred to as the upper surface, and the surface on the opposite side from the upper surface is referred to as the lower surface. These appellations involve no intention to restrict the orientation of installation of the planar waveguide laser device 1.

In the laser medium 3, the shape of an end facet perpendicular to the optical axis, or the shape of an x-y plane, is rectangular, for example. This end facet typically has a thickness of several μm to several tens of μm in the y-axis direction, and a width of several hundreds of μm to several mm in the x-axis direction.

The laser medium 3 may be a typical solid-state laser material such as crystal, ceramic, or glass to which an active medium such as Nd, Yb, Er, Tm, Ho, or Pr is doped. A solid-state laser material preferable to use is selected depending on the wavelength of laser light at which laser oscillation or amplification is performed. Examples of solid-state laser materials include Nd:YAG, Nd:YLF, Nd:Glass, Nd:YVO4, Nd:GdVO4, Yb:YAG, Yb:YLF, Yb:KGW, Er:Glass, Er:YAG, Er/Yb:Glass, Er/Yb:YAG, Tm:YAG, Tm:YLF, Ho:YAG, Ho:YLF, Ti:Sapphire, Cr:LiSAF, Pr:YLF, and Pr:Glass.

The laser medium 3 may be, for example, a hygroscopic material using glass as the host material. Examples of hygroscopic laser mediums using glass as the host material include Er:phosphate glass, Yb:phosphate glass, Er/Yb:phosphate glass, and Nd:phosphate glass.

The upper cladding 4 and the lower cladding 5 have a lower refractive index than the laser medium 3. The upper cladding 4 is joined to one surface parallel to an x-z plane of the laser medium 3, which is specifically the upper surface of the laser medium 3. The lower cladding 5 is joined to the other surface parallel to the x-z plane of the laser medium 3, which is the lower surface of the laser medium 3. Note that the laser medium 3 is formed within about 200 μm from an upper edge of the upper cladding 4 (or the upper surface of the waveguide 2).

The upper cladding 4 and the lower cladding 5 are layers that are made of an optical material and are formed on the laser medium 3 using a sputtering method, a vapor deposition method, a chemical vacuum deposition (CVD) method, or the like, for example. Alternatively, an optical material is optically joined to the laser medium 3 using optical contact or diffusion joining, to form the upper cladding 4 and the lower cladding 5. Further alternatively, an optical adhesive having a lower refractive index than the laser medium 3 may be used as the upper cladding 4 and the lower cladding 5.

Out of the above mentioned methods for forming the upper cladding 4 and the lower cladding 5, a method of forming a layer using vapor deposition or the like facilitates control of the cladding layer thickness, and enables precise thickness control. Also, the manufacturing process is simpler for a case where formation of a layer is performed than for a case where a joining method is used. Therefore, a method of forming a layer is advantageous when a large number of planar waveguide laser devices 1 are manufactured at once.

The substrate 6 is joined to the upper surface of the waveguide 2. In the substrate 6, out of edges of an end facet, or the x-y plane, perpendicular to the optical axis, the edge that is close to the waveguide 2 is chamfered to form a recess 6a. Although not shown in the drawing, out of the edges of the end facet that is on the opposite side of the substrate 6, the edge that is close to the waveguide 2 is also chamfered to form a recess 6a. The chamfering is 45° chamfering, for example, and the dimension of the 45° chamfering is about several mm, for example. The substrate 6 is joined to the upper surface of the upper cladding 4 via a joining material (not shown), for example. An optical adhesive is used as the joining material, for example. The substrate 6 is not necessarily joined to the waveguide 2 with an optical adhesive, but may be joined to the waveguide 2 by optical contact or diffusion joining. An optical material or a metal is used as the substrate 6, for example. The substrate 6 preferably has substantially the same thermal expansion coefficient as that of the laser medium 3. If materials having substantially the same thermal expansion coefficients are selected, the laser medium 3 and the substrate 6 expand by almost the same amount when a temperature change or the like occurs during the process of manufacturing the planar waveguide laser device 1. Thus, it is possible to avoid problems such as material fracture due to mismatch in thermal expansion coefficient.

Note that the lower surface of the waveguide 2 may be joined to a heatsink (not shown). With the use of a heatsink joined to the waveguide 2, heat generated in the waveguide 2 can be dissipated. In this case, the waveguide 2 and the heatsink are joined with a joining material. The joining material preferably has a high heat conductivity.

The coating 7 is applied onto an end facet of the waveguide 2 perpendicular to the optical axis, or an x-y plane. The coating 7 is applied to provide the planar waveguide laser device 1 with desired optical characteristics, and is a dielectric multilayer film. A multilayer film is normally formed by alternately stacking a high-refractive-index material and a low-refractive-index material. To achieve desired optical characteristics of a multilayer film, kinds of materials forming the film, material thickness, the number of layers of the materials, and the like are designed in advance. The thickness of the dielectric multilayer film is about several μm to several tens of μm, and the dielectric multilayer film has a structure in which layers are stacked in the z-axis direction perpendicular to the end facet of the waveguide 2.

As shown in the cross-sectional view in FIG. 1A, the coating 7 is stacked on the end facet of the waveguide 2, and further extends on to the upper surface of the upper cladding 4 by several μm to several mm. This extending region is referred to as a wraparound portion 7a. As shown in the top view in FIG. 1B, the wraparound portion 7a is visible along the z-axis direction when the waveguide 2 is viewed from above. Note that the substrate 6 is not shown in FIG. 1B. In this manner, the coating 7 continuously covers the end facet of the waveguide 2 and the upper surface facing the recess 6a of the substrate 6.

Next, the laser operation in the planar waveguide laser device 1 is described. In FIG. 1A, excitation light enters from the left end of the laser medium 3 in the z-axis direction. While propagating in the z-axis direction, the excitation light is absorbed by the laser medium 3. As the excitation light is absorbed by the laser medium 3, the active medium is excited to produce a population inversion, and a gain with respect to the laser light is generated. Because of the gain generated in the laser medium 3, the laser light passing through the laser medium 3 is amplified, and the output power of the laser increases accordingly. The laser light whose output power is increased is emitted from the right end of the laser medium 3 outward, in FIG. 1A.

Note that the planar waveguide laser device 1 can be used as a laser amplifier by preparing a laser seed light and introducing it into the laser medium 3 to cause amplification. Also, the planar waveguide laser device 1 can be used as a laser oscillator by arranging an output mirror (not shown) for reflecting part of laser light in the optical axis so as to be perpendicular to the optical axis. The planar waveguide laser device 1 can be used as either a laser amplifier or a laser oscillator.

Next, a method of manufacturing the planar waveguide laser device 1 according to Embodiment 1 is described.

Since the laser medium 3 has a thickness of several μm to several tens of μm, it is difficult to fabricate individual planar waveguide laser devices 1 separately. Accordingly, a plurality of planar waveguide laser devices 1 are manufactured using a method illustrated in FIGS. 2A through 2H, for example.

Figure 2A:
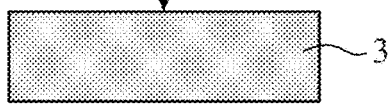
FIGS. 2A through 2H are process diagrams showing a method of manufacturing the planar waveguide laser device 1 according to Embodiment 1.

In FIG. 2A, the upper surface of the laser medium 3 is first polished.

Figure 2B:
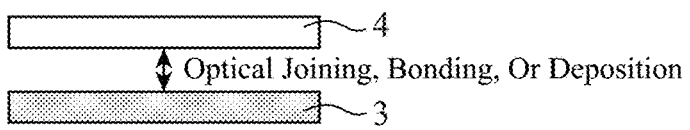

In FIG. 2B, a cladding material having a lower refractive index than that of the laser medium 3 is joined directly onto the upper surface of the laser medium 3 polished in FIG. 2A, by using optical contact or diffusion joining or the like. Thus, the upper cladding 4 is formed.

Alternatively, the substrate 6 made of a metal or an optical material is joined to the upper surface polished in FIG. 2A, with an optical adhesive having a lower refractive index than that of the laser medium 3. The optical adhesive is the upper cladding 4. Note that the recess 6a is formed beforehand in the substrate 6.

Alternatively, an optical film having a lower refractive index than that of the laser medium 3 may be formed on the upper surface polished in FIG. 2A. The optical film is the upper cladding 4.

Figure 2C:
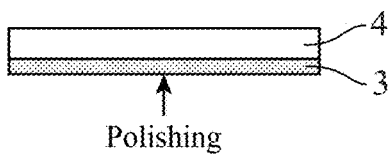

In FIG. 2C, the lower surface of the laser medium 3 is polished. Through this polishing, the laser medium 3 is made to have a desired thickness.

Figure 2D:
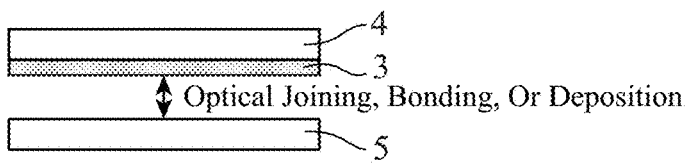

In FIG. 2D, a cladding material having a lower refractive index than that of the laser medium 3 is joined to the lower surface of the laser medium 3 polished in FIG. 2C, by using the same method as that in FIG. 2B. Thus, the lower cladding 5 is formed. In this manner, the waveguide 2 in which the laser medium 3, the upper cladding 4 and the lower cladding 5 are integrated is manufactured.

Figure 2E:
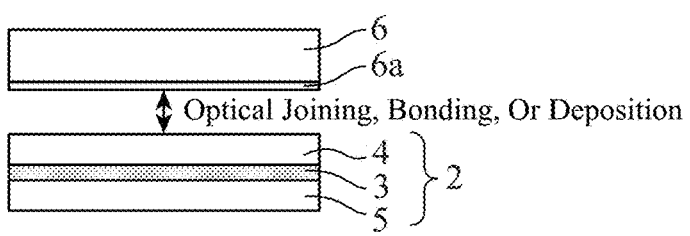

In FIG. 2E, the substrate 6 to which the recess 6a is formed beforehand is joined to the upper surface of the waveguide 2. In a case where the substrate 6 has already been joined to the waveguide 2 in FIG. 2B, however, the joining of the substrate 6 in this step is unnecessary.

Figure 2F:
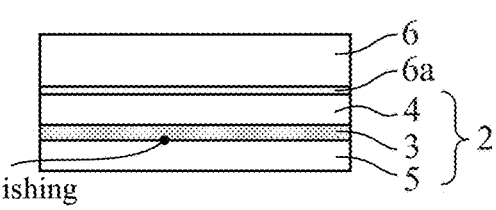

In FIG. 2F, the end facets of the waveguide 2 and the substrate 6 are optically polished. Although not shown, the end facets on the opposite side are also optically polished.

Figure 2G:
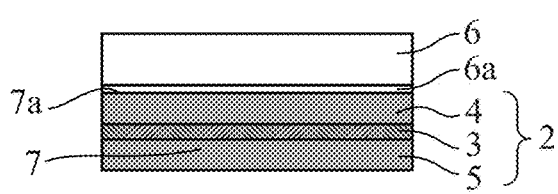

In FIG. 2G, the coating 7 is formed on the end facet of the waveguide 2 polished in FIG. 2F. At this stage, the coating 7 is formed to extend onto the portion of the upper surface of the waveguide 2 that faces the recess 6a of the substrate 6, and thus, the wraparound portion 7a is formed. Although not shown, the coating 7 and the wraparound portion 7a are also formed on the end facet and the upper surface of the waveguide 2 on the opposite side.

As a result, a coating that continuously covers the end facet of the waveguide 2 perpendicular to the direction of laser oscillation and the upper surface of the waveguide 2 facing the recess 6a of the substrate 6 is formed.

Figure 2H:
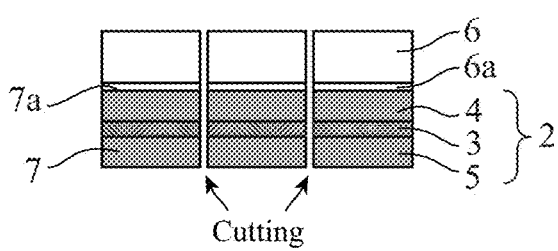

In FIG. 2H, the waveguide 2 and the substrate 6 are cut to form a plurality of planar waveguide laser devices 1 with desired size.

FIG. 3A is a diagram showing a shape of the waveguide 2 with a surface deflection. FIG. 3B is a diagram showing an ideal shape of the waveguide 2 with no surface deflections. FIGS. 3A and 3B are conceptual diagrams showing the influence of a surface deflection on the laser light propagating in the waveguide 2.

In the polishing step shown in FIG. 2F, surface deflections may occur at the edge regions of the polished surface. As shown in FIG. 3A, in the waveguide 2 to which the substrate 6 is not joined, because the end facet of the waveguide 2 corresponds to the polished surface, a surface deflection may occur at an upper edge region A of the upper cladding 4 and a lower edge region B of the lower cladding 5. In the event surface deflections occur, the angle of the end facet C of the laser medium 3 is increased. The angle of the end facet C means an inclination angle with respect to a reference plane, which is the x-y plane perpendicular to the z-axis direction. As the angle of the end facet C is increased, the shape of the end facet C deviates from the ideal vertical shape. As a result, the wavefront of the laser light propagating in the waveguide 2 deteriorates when the laser light is reflected on the end facet C. Therefore, optical loss of the laser light increases, and desired characteristics cannot be achieved.

In contrast, in the waveguide 2 to which the substrate 6 is joined as shown in FIG. 3B, because an upper edge region D of the substrate 6 and the lower edge region B of the lower cladding 5 are equivalent to edge regions of the polished surface, surface deflections may occur at these edge regions D and B. Meanwhile, the possibility of occurrence of surface deflection is greatly reduced for the region extending from the upper edge region A of the upper cladding 4 to the laser medium 3 because the substrate 6 is joined to the waveguide 2. Accordingly, the end facet C of the laser medium 3 that directly affects laser characteristics does not increase, maintaining the ideal vertical shape. Thus, optical loss of the laser light is reduced, and desired characteristics can be achieved.

Furthermore, in the planar waveguide laser device 1 of Embodiment 1, the wraparound portion 7a of the coating 7 extends onto the upper surface of the waveguide 2 as shown in FIG. 1A, and thus, stickiness between the end facet of the waveguide 2 and the coating 7 is increased. The adhesive force of the coating 7 can be increased particularly for the region extending from the upper cladding 4 to the laser medium 3 in the waveguide 2. Because of this, in the cutting step shown in FIG. 2H, the coating 7 is less likely to come off the end facet of the waveguide 2. Thus, it is possible to reduce the yield decrease, and establish a method of manufacturing planar waveguide laser devices 1 stably.

By contrast, in a case where the wraparound portion 7a of the coating 7 does not extend onto the upper surface of the waveguide 2, the coating 7 easily comes off the end facet of the waveguide 2 at the time of cutting, because of insufficient stickiness between the end facet of the waveguide 2 and the coating 7. As a result, the yield decreases, and it becomes difficult to realize a stable method of manufacturing planar waveguide laser devices 1.

Furthermore, in the planar waveguide laser device 1 of Embodiment 1, because the wraparound portion 7a of the coating 7 extends onto a portion of the upper surface of the waveguide 2, moisture can be prevented from flowing in through a narrow gap between the end facet of the waveguide 2 and the coating 7. Accordingly, moisture absorption by the laser medium 3 can be reduced, and thus, storage in a normal environment is made easier.

In a conventional case where a hygroscopic material containing glass as the host material is used as the laser medium 3, for example, long-term storage is not possible, and a humidity-controlled environment is necessary. Therefore, storage in a normal environment is difficult. In the planar waveguide laser device 1 of Embodiment 1, on the other hand, moisture absorption by the laser medium 3 can be reduced, and storage in a normal environment is made easier. In addition to these effects, a hygroscopic material can be used as the laser medium 3.

As described above, the planar waveguide laser device 1 according to Embodiment 1 includes: waveguide 2 including the laser medium 3 having a flat plate-like shape, the upper cladding 4 joined to the upper surface of the laser medium 3, and the lower cladding 5 joined to the lower surface of the laser medium 3; the substrate 6 joined to an upper surface of the waveguide 2;

the substrate 6 comprising the recess 6a with a chamfered shape along an edge of an end facet of the substrate, the edge facing the waveguide 2, and the end facet of the substrate 6 being perpendicular to the oscillation direction of laser light; and the coating 7 continuously covering the end facet of the waveguide 2 perpendicular to the oscillation direction of laser light, and the upper surface of the waveguide 2 facing the recess 6a of the substrate 6. With this configuration, it is possible to prevent surface deflection in the end facet of the waveguide 2 during optical polishing, and prevent deterioration of the wavefront of light in the coating surface and thus, it is possible to reduce optical loss. Furthermore, the adhesion between the end facet of the waveguide 2 and the coating 7 is increased. Thus, the coating 7 does not easily come off the end facet of the waveguide 2. In addition, in a case where a hygroscopic material is used as the laser medium 3, moisture is prevented from flowing in, so that storage in a normal environment is made easier. As described above, it becomes possible to improve the yield at the time of manufacturing planar waveguide laser devices 1, establish a stable manufacturing method, and simplify the handling of a planar waveguide laser device 1 using a hygroscopic laser medium 3.

In Embodiment 1, the coating 7 is designed to extend onto only the upper surface of the waveguide 2. However, the coating 7 may be designed to extend to the lower surface of the waveguide 2, or extend to both the upper surface and the lower surface of the waveguide 2.

Figure 4:
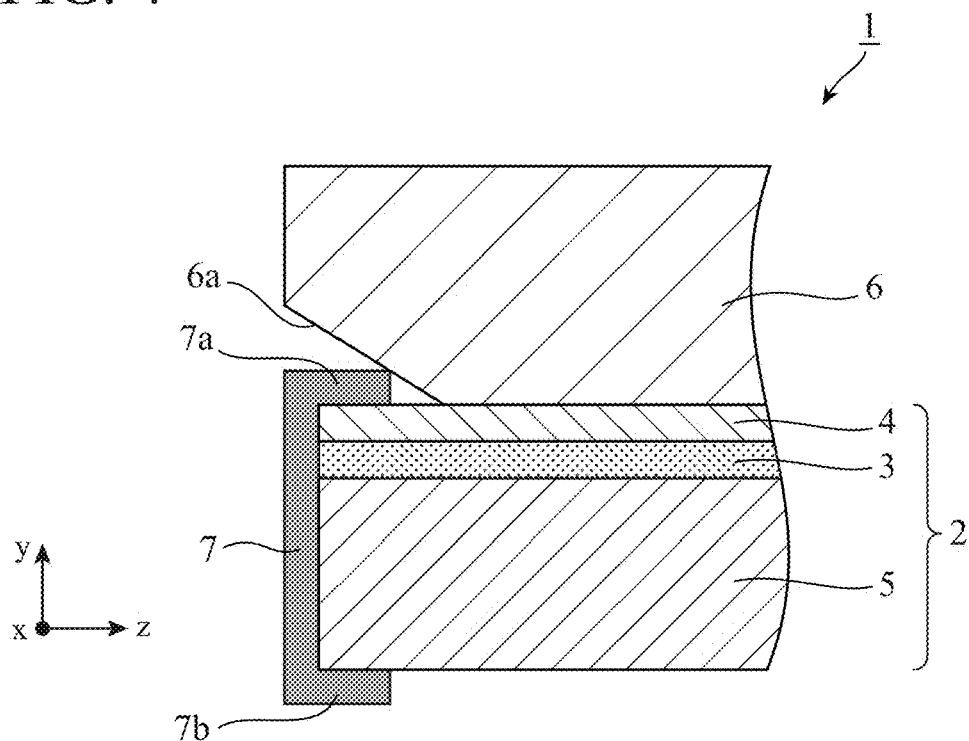
FIG. 4 is a cross-sectional view of a modification of the planar waveguide laser device according to Embodiment 1.

Here, a modification of the planar waveguide laser device 1 according to Embodiment 1 is shown in a cross-sectional view in FIG. 4. In the example shown in FIG. 4, the coating 7 that covers the end facet of the waveguide 2 includes the wraparound portion 7a that extends onto the upper surface of the waveguide 2 and a wraparound portion 7b that extends onto the lower surface of the waveguide 2.

In a case where the coating 7 extends onto both the upper surface and the lower surface of the waveguide 2, the adhesion between the end facet of the waveguide 2 and the coating 7 is enhanced at both the upper surface of the upper cladding 4 and the lower surface of the lower cladding 5. Accordingly, compared with a configuration in which the coating 7 extends onto only the upper surface of the waveguide 2, the adhesion between the end facet of the waveguide 2 and the coating 7 is further enhanced.

Furthermore, in a case where the above mentioned hygroscopic material is used as the laser medium 3, the adhesion between the lower surface of the lower cladding 5 and the coating 7 is enhanced, so that moisture flowing in therefrom decreases. Accordingly, compared with a configuration in which the coating 7 wraps around only the upper surface of the waveguide 2, the reduction of the hygroscopicity of the laser medium 3 and the easiness of storage in a normal environment are further improved.

Also, according to Embodiment 1, even in a case where the laser medium 3 is made of a hygroscopic material, the coating 7 extends onto the upper surface of the waveguide 2 so that the moisture absorption from the gap between the end facet of the waveguide 2 and the coating 7 can be reduced. As the moisture-proof effect is increased, the reliability of the planar waveguide laser device 1 can be improved. Examples of moisture-proof materials include Er:phosphate glass, Yb:phosphate glass, Er/Yb:phosphate glass, and Nd:phosphate glass.

Furthermore, according to Embodiment 1, the thermal expansion coefficient of the substrate 6 and the thermal expansion coefficient of the laser medium 3 are set at the same value, so that the degrees of thermal expansion due to temperature change during the manufacture of the planar waveguide laser devices 1 are equal or similar. Thus, it is possible to avoid problems such as material fracture due to mismatch in thermal expansion coefficient.

Also, according to Embodiment 1, in a case where the upper cladding 4 and/or the lower cladding 5 is formed by vapor deposition on the laser medium 3, it is possible to control the thicknesses of the cladding layers precisely.

Embodiment 2

Figure 5:
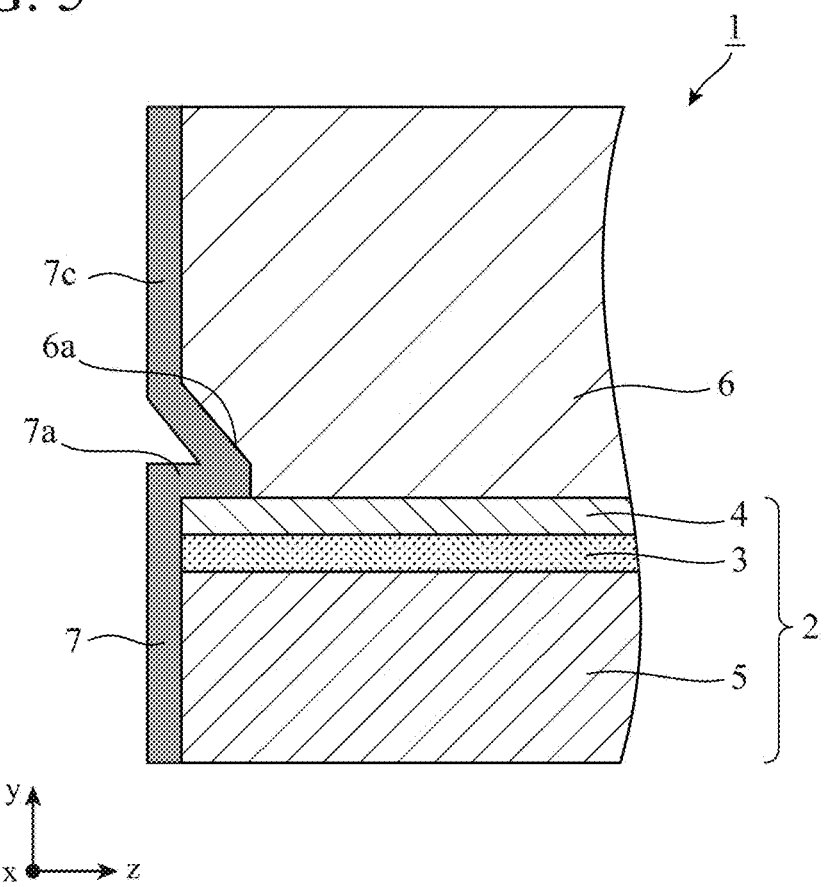
FIG. 5 is a cross-sectional view showing the relationship between a waveguide and a coating in a planar waveguide laser device according to Embodiment 2 of the present disclosure.

FIG. 5 is a cross-sectional view showing the relationship between a waveguide 2 and a coating 7 in a planar waveguide laser device 1 according to Embodiment 2 of the present disclosure. In FIG. 5, the components that are the same as or similar to those in FIG. 1A are denoted by the same reference numerals as those used in FIG. 1A, and explanation of them is not repeated herein.

The planar waveguide laser device 1 according to Embodiment 2 differs from the planar waveguide laser device 1 according to Embodiment 1 shown in FIG. 1A in that the coating 7 includes a substrate coating portion 7c that covers the recess 6a of the substrate 6 and the end facet of the substrate 6.

Next, a method of manufacturing the planar waveguide laser device 1 according to Embodiment 2 is described.

First, the procedure described with reference to FIGS. 2A through 2F is the same as in Embodiment 1. The steps after that differs from those in Embodiment 1, and the different steps according to Embodiment 2 are now described with reference to FIGS. 6A and 6B. That is, the method of manufacturing the planar waveguide laser device 1 according to Embodiment 2 is in the order of FIG. 2A, FIG. 2B, FIG. 2C, FIG. 2D, FIG. 2E, FIG. 2F, FIG. 6A, and FIG. 6B.

Figure 6A:
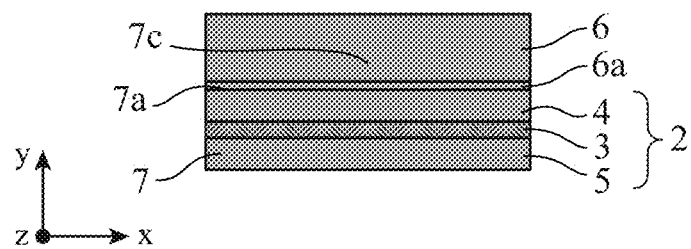
FIGS. 6A and 6B are process diagrams showing a method of manufacturing the planar waveguide laser device 1 according to Embodiment 2.

In FIG. 6A, the coating 7 is formed on the end facet of the waveguide 2 to which the substrate 6 is joined. At this stage, the coating 7 extends onto the region of the upper surface of the waveguide 2 that faces the recess 6a of the substrate 6, and thus, the wraparound portion 7a is formed. Furthermore, the coating 7 extends onto the recess 6a of the substrate 6 and the end facet of the substrate 6, so that the substrate coating portion 7c is formed. Although not shown in the drawing, the coating 7, the wraparound portion 7a, and the substrate coating portion 7c are also formed on the end facet and the upper surface of the waveguide 2, and the recess 6a and the end facet of the substrate 6 on the opposite side.

As a result, a coating is formed to continuously cover the recess 6a of the substrate 6 and the end facet of the substrate 6, as well as the end facet of the waveguide 2 perpendicular to the direction of laser oscillation and the upper surface of the waveguide 2 facing the recess 6a of the substrate 6.

Figure 6B:
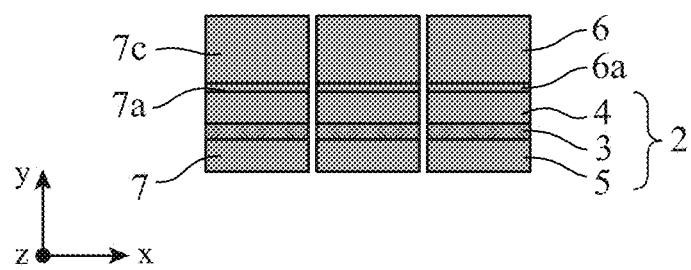

In FIG. 6B, the waveguide 2 and the substrate 6 are cut to form planar waveguide laser devices 1 of desired size.

The planar waveguide laser device 1 of Embodiment 2 is polished in a state where the substrate 6 is joined to the waveguide 2 as in Embodiment 1. Accordingly, the possibility of surface deflection is greatly reduced in the region extending from the upper edge region of the upper cladding 4 to the laser medium 3. Thus, optical loss of laser light is reduced, and desired characteristics can be achieved.

Also, in the planar waveguide laser device 1 of Embodiment 2, the substrate coating portion 7c of the coating 7 extends to the crevice between the upper surface of the waveguide 2 and the recess 6a of the substrate 6, as shown in FIG. 5. Accordingly, the stickiness between the end facet of the waveguide 2 and the coating 7 is improved, and the coating 7 is less likely to come off the end facet of the waveguide 2 at the time of cutting. Thus, it is possible to reduce the yield decrease, and establish a stable method of manufacturing planar waveguide laser devices 1.

Furthermore, in the planar waveguide laser device 1 of Embodiment 2, because the substrate coating portion 7c of the coating 7 extends to the crevice between the upper surface of the waveguide 2 and the recess 6a of the substrate 6, moisture can be prevented from flowing in through the narrow gap between the end facet of the waveguide 2 and the coating 7. Accordingly, moisture absorption by the laser medium 3 can be reduced, and thus, storage in a normal environment becomes easier. In addition to that, a hygroscopic material can be used as the laser medium 3.

As described above, in the planar waveguide laser device 1 according to Embodiment 2, the coating 7 is designed to continuously cover the recess 6a of the substrate 6 and the end facet of the substrate 6, as well as the end facet of the waveguide 2 perpendicular to the direction of laser oscillation and the upper surface of the waveguide 2 facing the recess 6a of the substrate 6. With this configuration, it is possible to prevent surface deflection in the end facet of the waveguide 2 during optical polishing, and prevent deterioration of the wavefront of light in the coating surface and thus, it is possible to reduce optical loss. Furthermore, the adhesion between the end facet of the waveguide 2 and the coating 7 is increased. Thus, the coating 7 does not easily come off the end facet of the waveguide 2. In addition, in a case where a hygroscopic material is used as the laser medium 3, moisture is prevented from flowing in, so that storage in a normal environment is made easier. As described above, it is possible to improve the yield at the time of manufacturing planar waveguide laser devices 1, establish a stable manufacturing method, and simplify the handling of a planar waveguide laser device 1 using a hygroscopic laser medium 3.

In Embodiment 2, the coating 7 is designed to extend onto the upper cladding 4 and the substrate 6. However, the coating 7 may be designed to extend onto the lower surface of the waveguide 2, or extend onto both the upper surface and of the lower surface of the waveguide 2.

Furthermore, the coating 7 may be designed to extend onto not only the end facet of the substrate 6 but also the upper surface of the substrate 6.

Figure 7:
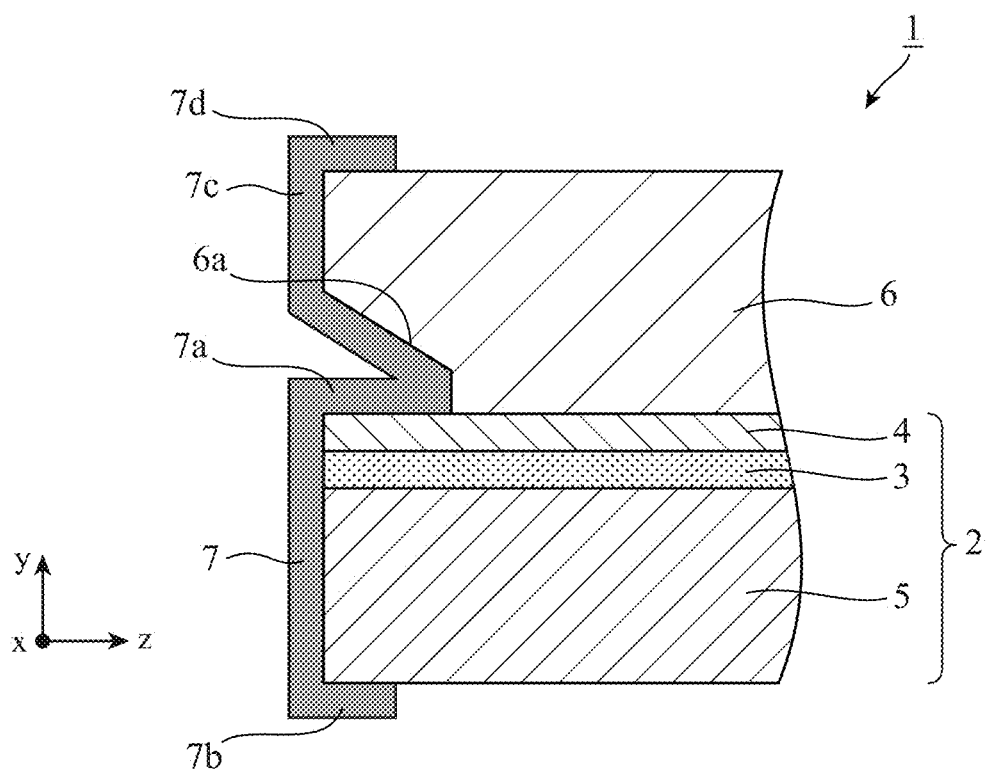
FIG. 7 is a cross-sectional view of a modification of the planar waveguide laser device according to Embodiment 2.

Here, a modification of the planar waveguide laser device 1 according to Embodiment 2 is shown in a cross-sectional view in FIG. 7. In the example shown FIG. 7, the coating 7 that covers the end facet of the waveguide 2 includes the wraparound portion 7a that extends onto the upper surface of the waveguide 2, the substrate coating portion 7c that extends onto the end facet of the substrate 6, and a substrate wraparound portion 7d that extends onto the upper surface of the substrate 6. It is obvious that the adhesion between the upper surface of the substrate 6 and the coating 7 is enhanced in a case where the coating 7 is designed to extend onto the upper surface of the substrate 6.

In Embodiment 1 or 2, a configuration in a case in which the coating 7 is formed on the end facet of the waveguide 2 or the substrate 6 perpendicular to the direction of laser oscillation is shown. The configuration according to Embodiment 1 or 2 may be applied to a coating formed on a surface other than the above. That is, in FIG. 1A, for example, a configuration in which Embodiment 1 or 2 is applied to the coating 7 formed on an x-y plane of the waveguide 2 is shown. Embodiment 1 or 2 may be applied to the coating 7 in a case where the coating 7 is formed on the other x-y plane of the waveguide 2. Embodiment 1 or 2 may also be applied to the coating 7 in a case where the coating 7 is formed on a y-z plane of the waveguide 2. In that case, the same effects as those of Embodiment 1 or 2 are achieved.

In the examples described in Embodiment 1 or 2, the planar waveguide laser device 1 is used as a planar waveguide laser oscillator or a planar waveguide laser amplifier in which the laser medium 3 having a gain serves as the core. The planar waveguide laser device 1 can be widely used as other optical elements having a planar waveguide structure.

For example, instead of the laser medium 3, a substantially transparent optical material capable of guiding laser light may be used as the core. Alternatively, a polarization-inverted nonlinear material for converting the wavelength of incoming laser light may be used as the core. Also, a diffractive element such as a volume Bragg grating may be used as the core.

In a case where such a material is used as the core material in manufacturing a planar waveguide optical element, it is of course possible to achieve the same effects as those of Embodiment 1 or 2 by applying a configuration according to Embodiment 1 or 2.

Furthermore, it is possible to increase the resistance of the waveguide 2 by adopting the substrate 6 described in Embodiment 1 or 2. Particularly, in a case where the thickness of the waveguide 2 formed with the upper cladding 4, the laser medium 3 and the lower cladding 5 is small, not only the resistance of the waveguide 2 but also the easiness of handling the waveguide 2 increases.

Furthermore, in Embodiment 1 or 2, although the substrate 6 having the recess 6a is joined to the upper cladding 4, this is a non-limiting configuration. The substrate 6 having the recess 6a may be joined to the lower cladding 5. In this case, surface deflection can be prevented in the region extending from the lower edge region of the lower cladding 5 to the laser medium 3 at the time of end facet polishing.

Embodiment 3

In the planar waveguide laser devices 1 of Embodiment 1 or 2, the laser medium 3 has a flat plate-like shape, and the laser medium 3 has the same size as the upper cladding 4 and the substrate 6 in the width direction. However, this configuration is not limiting. A ridge structure may be provided on the upper surface or the lower surface of the laser medium 3.

Figure 8A:
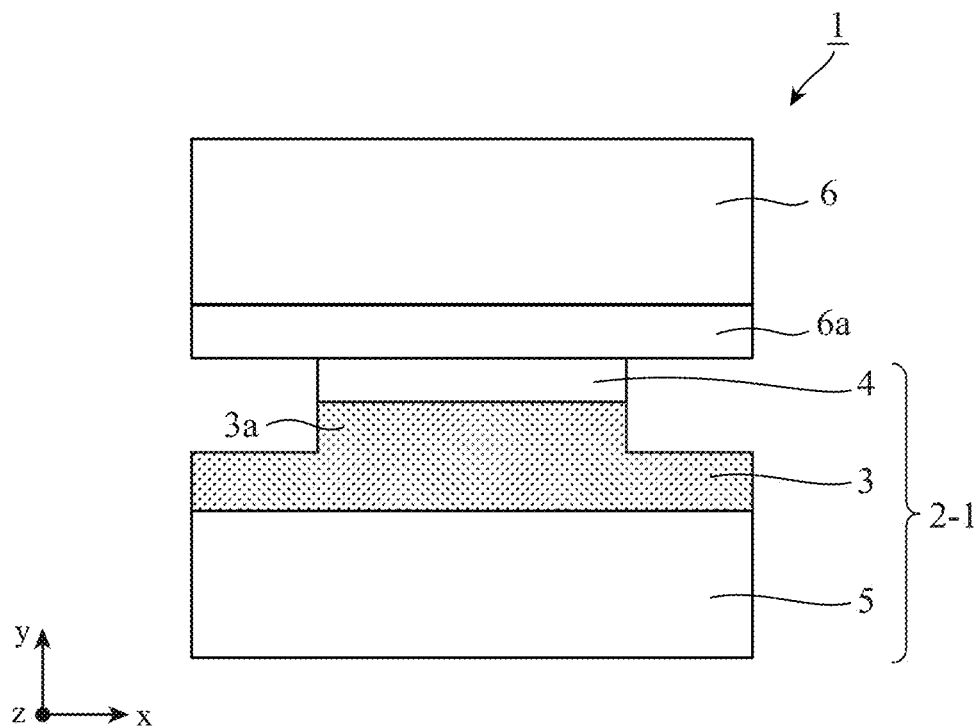
FIG. 8A is a diagram showing a layer structure of a planar waveguide laser device according to Embodiment 3 of present disclosure, as viewed from an end facet side.
Figure 8B:
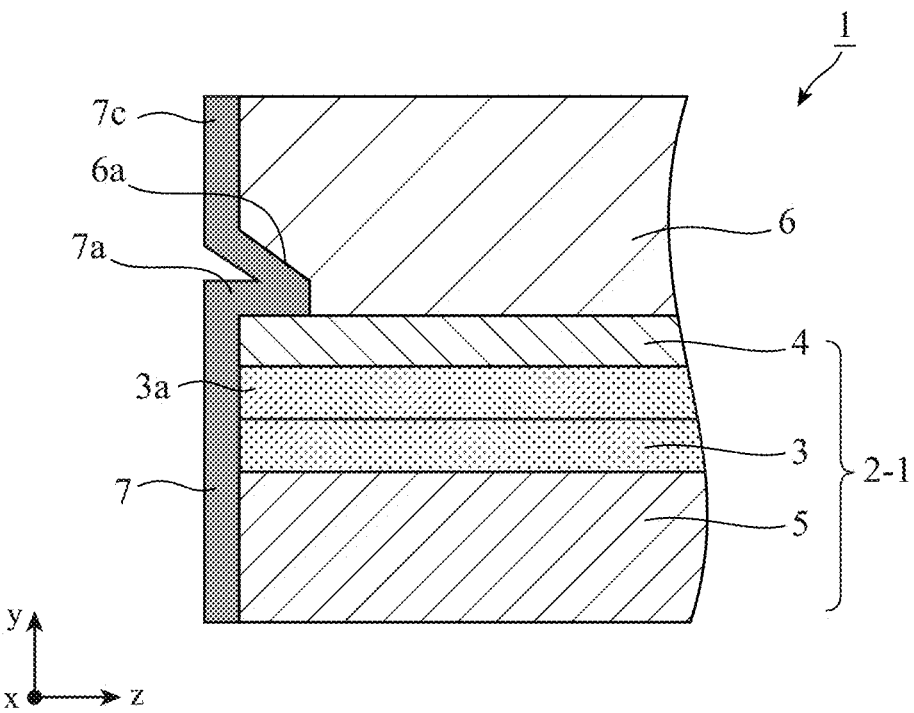
FIG. 8B is a cross-sectional view of the layer structure as viewed from a side surface.

FIG. 8A is a diagram showing a layer structure of a planar waveguide laser device 1 according to Embodiment 3 of the present disclosure, as viewed from an end facet side. Note that the coating 7 is not shown in FIG. 8A. FIG. 8B is a cross-sectional view showing the relationship between a waveguide 2 and the coating 7 in the planar waveguide laser device 1 according to Embodiment 3 of the present disclosure. In FIGS. 8A and 8B, the components that are the same as or similar to those in FIG. 5 are denoted by the same reference numerals as those used in FIG. 5, and explanation of them is not repeated herein.

The planar waveguide laser device 1 according to Embodiment 3 differs from the planar waveguide laser device according to Embodiment 2 shown in FIG. 5 in that a raised portion 3a is formed on the upper surface of the laser medium 3. Furthermore, the upper cladding 4 is formed on the upper surface of the raised portion 3a.

Note that, in the example shown in FIGS. 8A and 8B, the raised portion 3a is formed on the upper surface of the laser medium 3. However, this configuration is not limiting. A raised portion 3a may be formed on the lower surface of the laser medium 3.

The waveguide in which the laser medium 3 has the raised portion 3a is called a ridge waveguide 2-1, particularly as opposed to the waveguide 2 with no projections or depressions as shown in Embodiments 1 and 2. In the case of the ridge waveguide 2-1, the equivalent refractive index in the raised portion 3a is higher than the equivalent refractive index in the portion other than the raised portion 3a of the laser medium 3. For this reason, in an x-y plane perpendicular to the z-axis direction, which is the optical axis, light in two directions is confined and guided. Furthermore, the laser medium 3 having the raised portion 3a has a small mode field diameter and a high excitation density. Accordingly, a large gain can be obtained even in a case where a laser medium having a small stimulated-emission cross-section is used. Thus, high-efficiency amplification and oscillating operation can be characteristically realized.

Although a method of manufacturing the ridge waveguide 2-1 is not specifically described herein, in an etching step (not shown) after the waveguide 2 is formed through the process described in FIG. 2D, etching is performed on the upper cladding 4 and the laser medium 3, so that the ridge waveguide 2-1 having the raised portion 3a formed therein as shown in FIG. 8A is formed. Thereafter, the substrate 6 is joined to the ridge waveguide 2-1, as in FIG. 2E.

Although the structure of the ridge waveguide 2-1 has been described with reference to FIGS. 8A and 8B, the ridge waveguide 2-1 does not necessarily have the structure shown in these drawings. FIG. 9, FIGS. 10A and 10B, and FIGS. 11A and 11B show modifications of the ridge waveguide 2-1 in the planar waveguide laser device 1 according to Embodiment 3.

For example, as shown in FIG. 9, the ridge waveguide 2-1 may have two or more raised portions 3a and the substrate 6 may be joined to the upper surfaces of the raised portions 3a. In this case, the junction area between the substrate 6 and the upper cladding 4 is large, and accordingly, stable joining can be achieved. Note that, in this configuration having the two or more raised portions 3a, the number of the raised portions 3a is not limited to that shown in FIG. 9, and five or ten raised portions 3a may of course be provided, for example. Also, in FIGS. 10A and 10B, and FIGS. 11A and 11B, which will be described later, the ridge waveguide 2-1 may of course have two or more raised portions 3a.

Figure 10A:
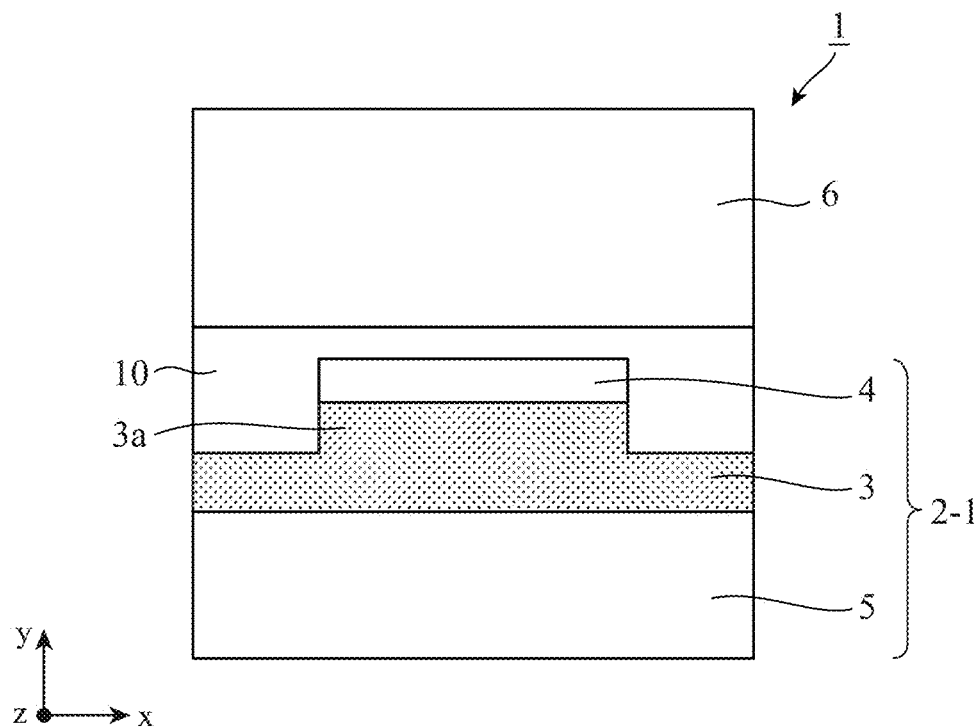
FIGS. 10A and 10B are diagrams showing a modification of the planar waveguide laser device according to Embodiment 3.
Figure 10B:
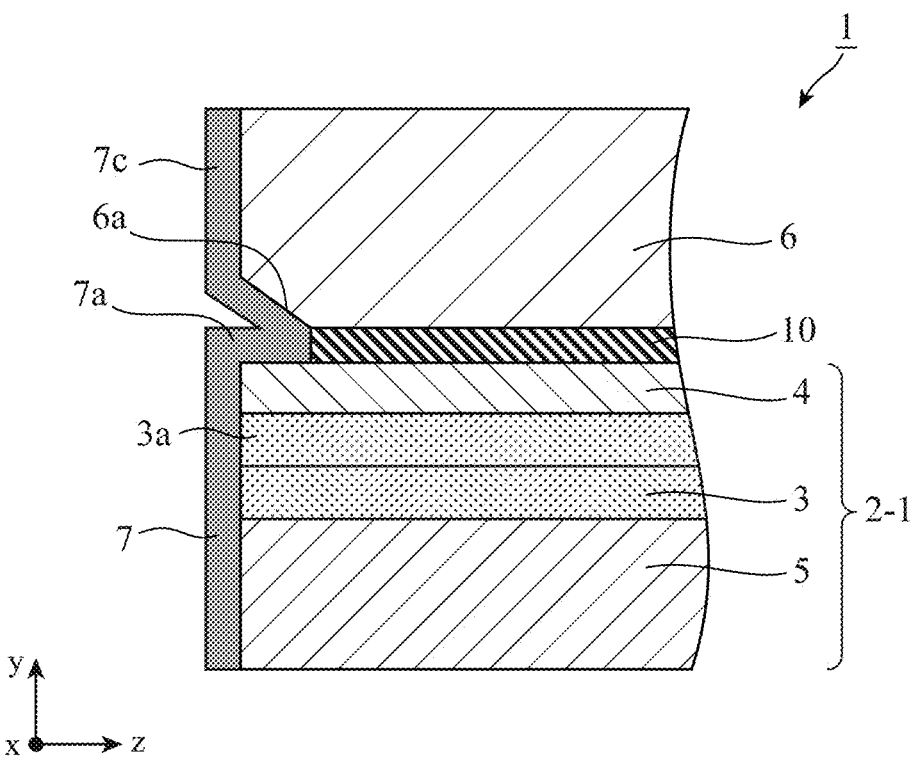

Furthermore, as shown in FIGS. 10A and 10B, the ridge waveguide 2-1 and the substrate 6 may be bonded to each other with an adhesive 10, for example. More specifically, the substrate 6 and the upper surface of the raised portion 3a, and the substrate 6 and the recessed upper surface of the laser medium 3 may be bonded with the adhesive 10. Here, the adhesive 10 to be used is preferably an optical adhesive having excellent transparency. However, the adhesive 10 is not limited to such an optical adhesive. In this configuration, the recessed spaces of the ridge can be filled with the adhesive 10. Accordingly, the secured area is large, and stable joining can be achieved.

Figure 11A:
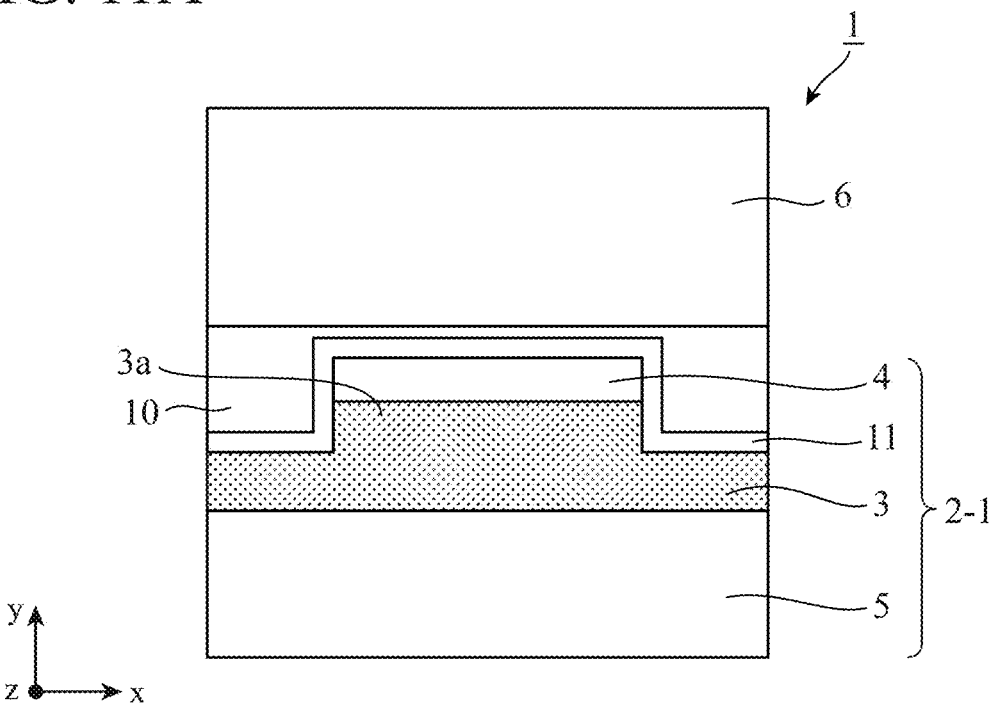
FIGS. 11A and 11B are diagrams showing a modification of the planar waveguide laser device according to Embodiment 3.
Figure 11B:
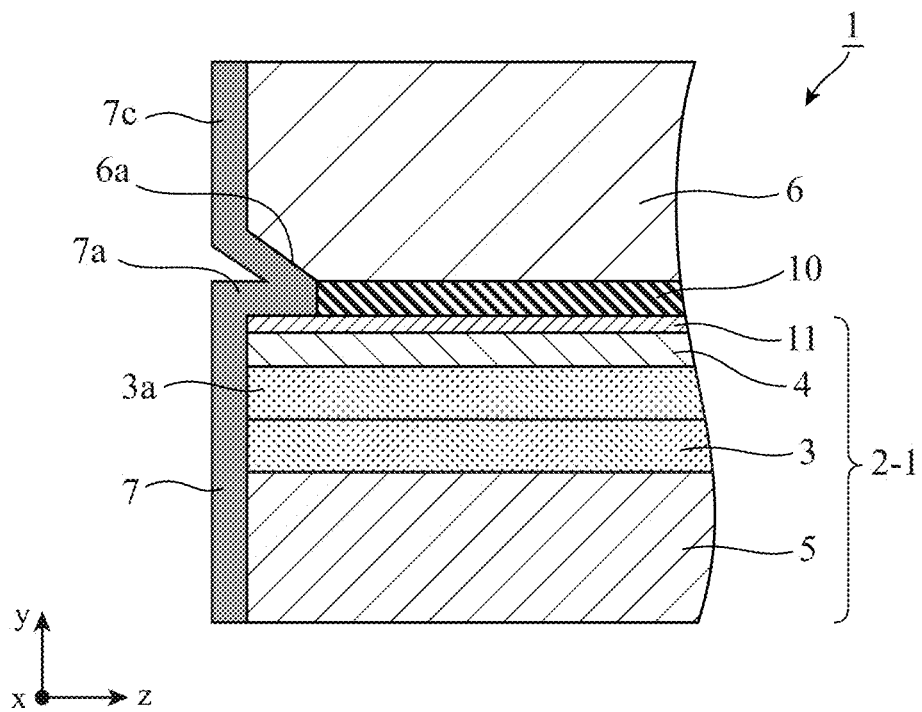

Alternatively, a cladding material may be deposited on the entire upper surface of the ridge waveguide 2-1 to form a layer-forming cladding 11, and after that, the substrate 6 may be bonded with an adhesive 10, as shown in FIGS. 11A and 11B. More specifically, the layer-forming cladding 11 is formed on the upper surface and the side surfaces of the raised portion 3a of the ridge waveguide 2-1, and the recessed upper surface of the laser medium 3. A material having a lower refractive index than the refractive index of the laser medium 3 is used as the layer-forming cladding 11. After that, the substrate 6 and the layer-forming cladding 11 are bonded to each other with the adhesive 10. Note that part of the laser light propagating in the ridge waveguide 2-1 might leak into the adhesive 10, resulting in deterioration. As the layer-forming cladding 11 is provided, it is possible to prevent part of laser light from leaking into the adhesive 10, and thus, prevent deterioration of the adhesive 10. Furthermore, as the upper surface of the laser medium 3 is covered with the layer-forming cladding 11, it is possible to prevent moisture from flowing into the upper surface of the laser medium 3. Thus, the coating cladding layer 11 has a moisture-proof effect on a hygroscopic laser medium 3.

In the above described example, the waveguide 2 of the planar waveguide laser device 1 according to Embodiment 2 is modified as the ridge waveguide 2-1. However, this configuration is not limiting. The waveguide of the planar waveguide laser device 1 according to Embodiment 1 may be modified to include the ridge waveguide 2-1.

Note that, within the scope of the present invention, Embodiments can be freely combined, modifications may be made to any component of each Embodiment, or any component may be omitted from each Embodiment.

INDUSTRIAL APPLICABILITY

As a waveguide with smaller optical loss is achieved, a planar waveguide laser device according to the present disclosure is suitable to be used as a planar waveguide laser oscillator, a planar waveguide laser amplifier, or the like.

REFERENCE SIGNS LIST

1: Planar waveguide laser device, 2: Waveguide, 2-1: Ridge waveguide, 3: Laser medium, 3a: Raised portion, 4: Upper cladding, 5: Lower cladding, 6: Substrate, 6a: Recess, 7: Coating, 7a, 7b: Wraparound portion, 7c: Substrate coating portion, 7d: Substrate wraparound portion, 10: Adhesive, 11: Layer-forming cladding layer.

The invention claimed is:

1. A planar waveguide laser device comprising:
   a waveguide including a laser medium having a flat plate-like shape, an upper cladding joined to an upper surface of the laser medium, and a lower cladding joined to a lower surface of the laser medium;
   a substrate joined to an upper surface of the waveguide;
   the substrate comprising a recess with a chamfered shape along an edge of an end facet of the substrate, the edge facing the waveguide, and the end facet of the substrate being perpendicular to an oscillation direction of laser light; and
   a coating continuously covering an end facet of the waveguide perpendicular to the oscillation direction of laser light, and the upper surface of the waveguide facing the recess of the substrate.

2. The planar waveguide laser device according to claim 1, wherein the waveguide is a ridge waveguide having a raised portion on one of the upper surface and the lower surface of the laser medium.

3. The planar waveguide laser device according to claim 1, wherein the coating continuously covers at least part of the lower surface of the waveguide, in addition to the end facet and the upper surface of the waveguide.

4. The planar waveguide laser device according to claim 1, wherein the coating continuously covers the recess of the substrate and the end facet of the substrate, in addition to the end facet and the upper surface of the waveguide.

5. The planar waveguide laser device according to claim 4, wherein the coating continuously covers at least part of an upper surface of the substrate, in addition to the end facet and the upper surface of the waveguide, and the recess and the end facet of the substrate.

6. The planar waveguide laser device according to claim 1, wherein the laser medium is made using a hygroscopic material.

7. The planar waveguide laser device according to claim 6, wherein the laser medium is one of Er:phosphate glass, Yb:phosphate glass, Er/Yb:phosphate glass, and Nd:phosphate glass.

8. The planar waveguide laser device according to claim 1, wherein a thermal expansion coefficient of the substrate is the same as a thermal expansion coefficient of the laser medium.

9. The planar waveguide laser device according to claim 1, wherein at least one of the upper cladding and the lower cladding is formed on the laser medium by performing vapor deposition.

10. The planar waveguide laser device according to claim 2, wherein the ridge waveguide has a plurality of raised portions on one of the upper surface and the lower surface of the laser medium.

11. The planar waveguide laser device according to claim 2, wherein the ridge waveguide has a layer-forming cladding layer vapor-deposited on an upper surface and a side surface of the raised portion, and on a recessed upper surface of the laser medium.

12. The planar waveguide laser device according to claim 2, wherein the ridge waveguide is bonded to the substrate with an adhesive.

* * * * *